(12) United States Patent
Drocco et al.

(10) Patent No.: US 10,209,121 B2
(45) Date of Patent: Feb. 19, 2019

(54) MULTIPLE WEIGHING SCALE

(71) Applicants: Luca Drocco, Alba (IT); Mario Drocco, Alba (IT)

(72) Inventors: Luca Drocco, Alba (IT); Mario Drocco, Alba (IT)

(*) Notice: Subject to any disclaimer, the term of this patent is extended or adjusted under 35 U.S.C. 154(b) by 222 days.

(21) Appl. No.: 15/321,950

(22) PCT Filed: Jun. 25, 2015

(86) PCT No.: PCT/IB2015/054764
§ 371 (c)(1),
(2) Date: Dec. 23, 2016

(87) PCT Pub. No.: WO2015/198253
PCT Pub. Date: Dec. 30, 2015

(65) Prior Publication Data
US 2017/0138784 A1  May 18, 2017

(30) Foreign Application Priority Data
Jun. 26, 2014  (IT) .............................. TO2014A0506

(51) Int. Cl.
*G01G 23/00* (2006.01)
*G01G 23/02* (2006.01)
*G01G 21/23* (2006.01)

(52) U.S. Cl.
CPC ............ *G01G 23/02* (2013.01); *G01G 21/23* (2013.01); *G01G 23/005* (2013.01)

(58) Field of Classification Search
CPC ....... G01G 21/23; G01G 23/02; G01G 23/005
USPC ........................................ 177/199, 200, 146
See application file for complete search history.

(56) References Cited

U.S. PATENT DOCUMENTS

| 4,307,787 A | * | 12/1981 | Raboud ................. | G01G 23/00 |
| | | | | 177/204 |
| 4,375,243 A | * | 3/1983 | Doll ....................... | G01G 19/00 |
| | | | | 177/164 |
| 4,711,314 A | * | 12/1987 | Suzuki ................... | G01G 21/00 |
| | | | | 177/164 |
| 4,778,016 A | * | 10/1988 | Uchimura .............. | G01G 23/36 |
| | | | | 177/164 |

(Continued)

FOREIGN PATENT DOCUMENTS

EP  2416133 A2  2/2012

OTHER PUBLICATIONS

International Search Report and Written Opinion from corresponding International Patent Application No. PCT/IB2015/054784, dated Oct. 2, 2015, 8 pages.

*Primary Examiner* — Randy W Gibson
(74) *Attorney, Agent, or Firm* — Merchant & Gould P.C.

(57) ABSTRACT

A multiple weighing scale includes a first measuring device and at least a second measuring device; both for detecting masses of objects. The weighing scale includes a single measuring plate, which is shared by all the measuring devices, arranged in contact with the first measuring device at least in an initial operating configuration and at least one first mobile structure, for selectively moving the second measuring device so as to selectively cause the second measuring device to come into contact with the measuring plate, in order to allow the measurement to be performed by the second measuring device instead of the first measuring device.

13 Claims, 4 Drawing Sheets

(56) References Cited

U.S. PATENT DOCUMENTS 5,190,117 A * 3/1993 Freeman .............. G01G 3/1402
                                                    177/211
7,989,714 B2 * 8/2011 Kresina ................. G01G 1/243
                                                    177/210 EM

* cited by examiner

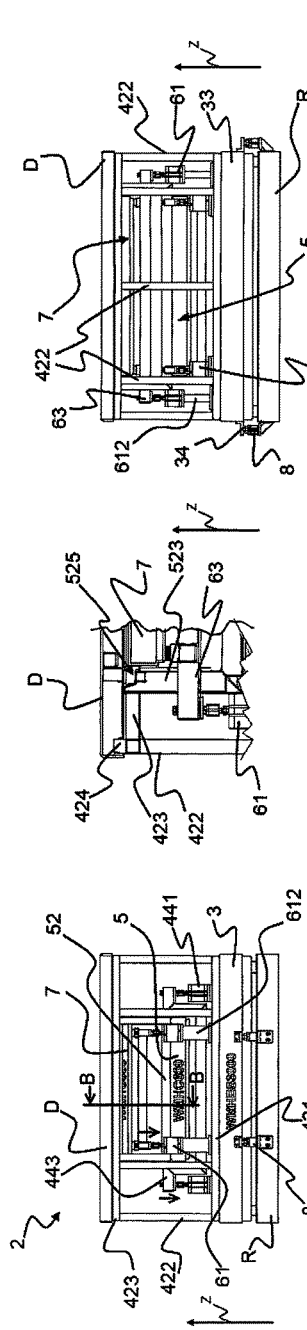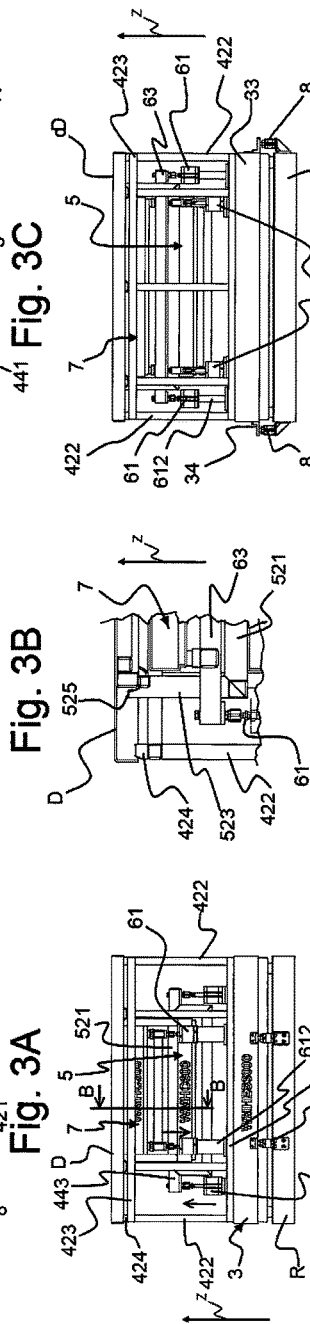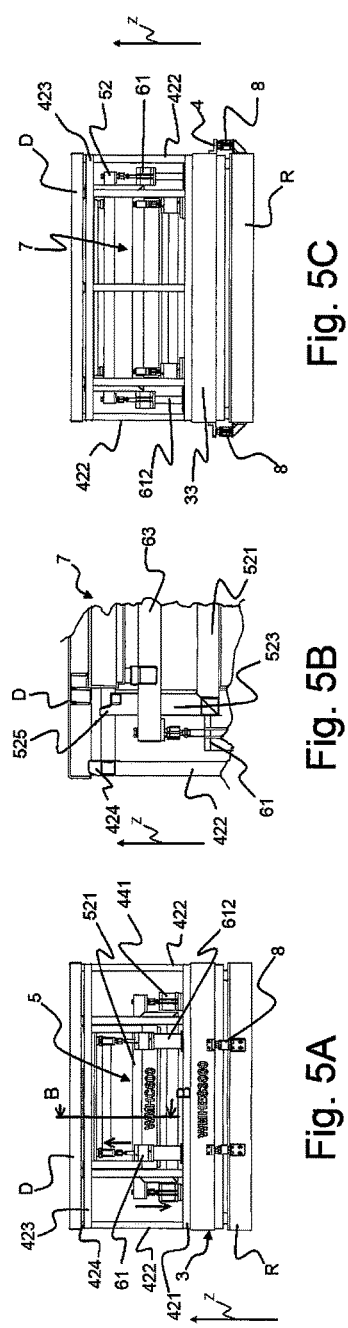

MULTIPLE WEIGHING SCALE

This application is a National Stage Application of PCT/IB2015/054764, filed 25 Jun. 2015, which claims benefit of Serial No. TO2014A000506, filed 26 Jun. 2014 in Italy and which applications are incorporated herein by reference. To the extent appropriate, a claim of priority is made to each of the above disclosed applications.

BACKGROUND OF THE INVENTION

The present invention relates to a multiple weighing scale, which is able to change the capacity and the resolution of the measurement based on the object whose mass must be measured.

In particular, the present invention relates to a scale, which is able is change the capacity and the resolution based on the object placed on the measuring plate, which is unique and on which any object can be placed.

An assembly of scales is known, wherein two measuring devices are arranged above each other, namely a second measuring device, which has a small capacity and a high resolution, is arranged above—in direct contact with—a first measuring device with a great capacity and a low resolution. In order to create a uniform surface, a support structure is fixed to the first measuring device and surrounds the second measuring device, thus creating a substantially uniform surface. This type of scale can work correctly if the objects with a mass exceeding the capacity of the second measuring device weigh on the support portion instead of on the second measuring device. Therefore, this type of scale has a limit concerning the shape of the objects to be placed on the scale assembly. Furthermore, the measuring plate is not unique.

The solution of the prior art makes it difficult for users to correctly place the object on the scale assembly, so as to carry out the measurement with the highest possible resolution, though preventing the measuring device from having to bear an object with a mass exceeding its own capacity.

The main technical problem to be solved is that of providing a scale in which the container simply needs to be placed on a measuring plate and the scale is able to detect the mass of the object with the highest possible resolution, at the same time avoiding possible damages to the measuring devices.

SUMMARY OF THE INVENTION

The object of the present invention is to solve the aforesaid technical problems by providing a multiple scale with a single measuring plate, on which users can place the object whose mass must be determined, said scale comprising at least one mobile structure, adapted to cause the weight of the object to weight on the suitable measuring device, so as to allow the mass of the object to be measured with the highest possible resolution, depending on the mass of the object itself.

One aspect of the present invention relates to a multiple scale.

A further aspect of the present invention relates to a method to control the multiple scale.

BRIEF DESCRIPTION OF THE DRAWINGS

The features and advantages of the multiple scale according to the present invention will be best understood upon perusal of the following detailed description of at least one embodiment with reference to the accompanying drawings, which respectively show what follows:

FIG. 1A shows the station comprising the multiple scale in a lateral view, FIG. 1B shows the same in station in a front view, FIG. 1C shows the scale placed on a pantograph system;

FIGS. 3A, 3B and 3C show, in different views, the multiple scale of FIG. 2 in the configuration in which the first measuring device measures the mass of the object placed on the measuring plate; in particular, FIG. 3A shows a lateral view of the multiple scale, FIG. 3B shows a detail, in a front view according to plane 3B-3B, close to the measuring plate, FIG. 3C shows an overall front view of the multiple scale of FIG. 3A;

FIGS. 4A, 4B and 4C show, in different views, the multiple scale of FIG. 2 in the configuration in which the second measuring device measures the mass of the object placed on the measuring plate; in particular, FIG. 4A shows a lateral view of the multiple scale, FIG. 4B shows a detail, in a front view according to plane 4B-4B, close to the measuring plate, FIG. 4C shows an overall front view of the multiple scale of FIG. 4A;

FIGS. 5A, 5B and 5C show, in different views, the multiple scale of FIG. 2 in the configuration in which the third measuring device measures the mass of the object placed on the measuring plate; in particular, FIG. 5A shows a lateral view of the multiple scale, FIG. 5B shows a detail, in a front view according to plane 5B-5B, close to the measuring plate, FIG. 5C shows an overall lateral view of the multiple scale of FIG. 5A;

DETAILED DESCRIPTION OF THE PREFERRED EMBODIMENT(S)

With reference to the figures mentioned above, multiple scale 2 according to the present invention comprises a first measuring device 3 and at least a second measuring device 5, both devices being designed to detect masses of one or more objects "O".

Said objects "O" preferably are containers for holding fluids such as paints, dyes, etc. or other objects that are normally used in the industry of paints and solvents. The containers that are normally used in the field of paints and solvents can have different sizes and different shapes.

Figure 1C:
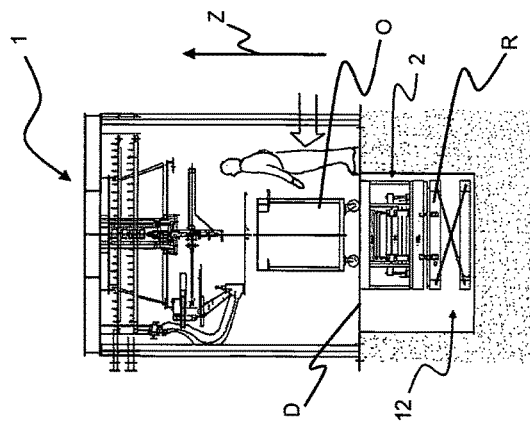
FIGS. 1A-1C show the multiple scale according to the present invention in an explanatory application, in particular under a dosing station; in particular.

These containers can also have different support systems; as a matter of fact, they can have a flat bottom or they can be provided with support feet and/or wheels that allow them to be moved. Said scale, in order to measure the mass of the object, does not require the container to have a special size or a particular structure, unlike prior art scales. FIG. 1C shows, by way of example, an object "O", which is placed on a scale 2 according to the present invention. Object "O" shown is a container provided with wheels.

Scale 2 according to the present invention comprises a single measuring plate "D", which is shared by all measuring devices (3, 5). In particular, in at least an initial operating configuration, said measuring plate "D" is preferably arranged in contact with said first measuring device 3.

Shared measuring plate "D" allows users to measure any kind and/or shape of object "O".

Scale 2 according to the present invention comprises, furthermore, at least one first mobile structure 4, for selectively moving said second measuring device 5, so as to selectively cause said second measuring device 5 to come into contact with said measuring plate "D".

Multiple scale 2 according to the present invention advantageously comprises a control device, for managing multiple scale 2 according to the present invention. The features and functions of said control device are discussed in detail below.

Said first mobile structure 4 is designed to allow the measurement to be performed by means of said second measuring device 5 instead of said first measuring device 3. In particular, when said second measuring device 5 is in contact with measuring plate "D", the first measuring device 3 is in a configuration in which it is detached from said measuring plate "D"; in particular, the first measuring device 3 is not in contact—either directly or through support structures—with said measuring plate "D". In an explanatory—though not limiting—embodiment, which is shown by way of example in the figures, measuring plate "D" indirectly weighs on the first measuring device 3, since measuring plate "D" weighs on the second measuring device 5, which, in turn, weighs on the first measuring device 3.

Said second measuring device 5 is at least partly moved, by means of said first mobile structure 4, along a vertical axis "Z". Said first mobile structure 4 can be able to move the second measuring device 5 by means of linear, rotary or rotary-translational movements, preferably just linear movements. Said axis "Z" is the normal of the plane defined by said measuring plate "D".

In order to describe in greater detail a possible explanatory—though not limiting—embodiment of the present invention, said first measuring device 3 is arranged above a reference plane "R". Said reference plane "R" is a plane that, for example, is arranged on the ground. In the explanatory embodiments shown in FIGS. 1A-1C, said reference plane "R" is arranged on a moving mechanism 12. FIG. 1C shows an embodiment of moving mechanism 12, in particular a pantograph mechanism, wherein said mechanism is directly fixed to the reference plane "R".

Reference plane "R" preferably consists of a rigid structure, such as, for example, a marble surface, a cement surface or a metal surface, the latter being particularly suited in case of a pantograph mechanism.

In terms of capacity, the first measuring device 3 is able to measure greater masses than said second measuring device 5. In terms of resolution, said second measuring device 5 has a higher measuring resolution than the first measuring device 3. In particular, the first measuring device 3 is able to measure masses with values that are at least twice, preferably at least four times, greater than those of the second measuring device 5, but with a resolution that is lower, by at least one order of magnitude, compared to said second measuring device 5.

Said first measuring device 3 preferably is an electronic scale, which, as such, is known to a person skilled in the art. By way of example, said first measuring device 3 has a capacity of approximately 3000 kg with a resolution of ±100 g.

Figure 2:
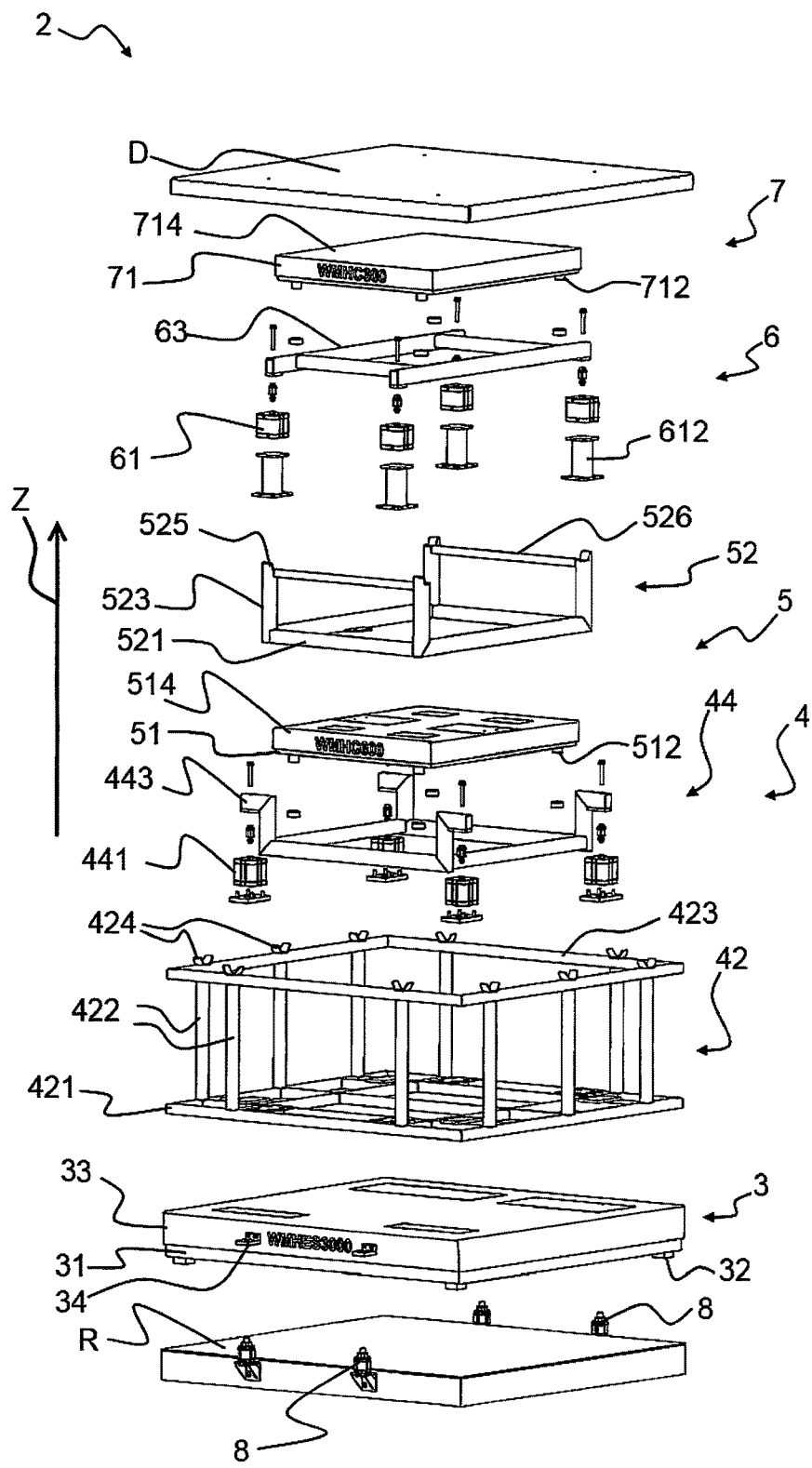
FIG. 2 shows an exploded view of the multiple scale in an explanatory embodiment provided with three measuring devices.

In the explanatory embodiment shown, for example, in FIG. 2, the first measuring device 3 comprises a casing 31 with the shape of a rectangle parallelepiped, feet 32 to support measuring device 3, for example on reference plane "R", arranged on the lower surface of casing 31, and a first measuring surface 33, which is arranged above the upper surface of casing 31 and defines a plane that is parallel to the plane defined by said measuring plate "D".

Casing 31 houses, on the inside, the electronic devices (not shown) for generating an electronic signal that is proportional to the mass of object "O", which is arranged—or at least indirectly weighs—on said first measuring surface 33 of the first measuring device 3.

Said second measuring device 5 preferably is an electronic scale. By way of example, said second measuring device 5 has a capacity of approximately 600 kg with a resolution of ±10 g.

In the explanatory embodiment shown, for example, in FIG. 2, the second measuring device 5 comprises a casing 51 with the shape of a rectangle parallelepiped, feet 512 to support measuring device 5, which are arranged on the lower surface of casing 51, and a second measuring surface 514, which is arranged above the upper surface of casing 51 and defines a plane that is parallel to the plane defined by said measuring plate "D".

Casing 51 houses, on the inside, the electronic devices adapted to generate an electronic signal that is proportional to the mass of object "O", which is arranged—or at least indirectly weighs—on said second measuring surface 514 of the second measuring device 5.

Alternative embodiments of said measuring devices, for measuring masses and, obviously, can be used in the place of the devices described above by way of the example, must be considered as part of the scope of protection of the present invention.

In the preferred embodiment, said at least a second measuring device 5 is arranged so as to weigh on said first measuring device 3. In particular, said at least one mobile structure 4 is arranged on said first measuring device 3.

This feature is displayed in the accompanying drawings, which show an explanatory—though not limiting—embodiment of the present invention, as shown in FIGS. 3A, 3C, 4A, 4C, 5A and 5C. In particular, said first mobile structure 4 weighs on said first measuring device 3. Said second measuring device 5, in turn, weighs on said first mobile structure 4. This embodiment is described more in detail below.

In an alternative embodiment, which is not shown herein, said second measuring device 5 and, as a consequence, the first mobile structure 4 do not directly weigh on said first measuring device 3, since they rest on said reference plane "R", as well.

In the preferred embodiment said first mobile structure 4 comprises: a fixed base 42; a first lifting structure 44, for selectively lifting said second measuring device 5 and comprising at least one first actuator device 441.

Said fixed base 42 preferably consists of a box-shaped structure comprising tubular elements, preferably with a rectangular cross section, that are connected to one another.

In the preferred embodiment, which is explained in detail below, at least in a first initial operating configuration, said measuring plate "D" weighs on said fixed base 42.

In the explanatory embodiment shown in FIG. 2, said fixed base 42 comprises a bottom 421, adapted to be fixed on a reference surface and is preferably arranged on the first measuring device 3, in particular on the first measuring surface 33, and uprights 422, which project from said bottom 421 and end in an upper structure 423.

In the area of said upper structure 423, in the upper portion of structure 423 itself, there is provided at least one support portion 424.

In the preferred embodiment, as shown, for example, in FIG. 2, there are provided a plurality of support portions 424, shaped so as to be complementary to respective striker elements (not shown) comprised in said measuring plate "D", in particular in the area of the lower surface of said plate "D".

Said first lifting structure 44 comprises a bearing base 443, on which said second measuring device 5 weighs and upon which said first actuating device 441 acts so as to move the second measuring device 5 itself.

In the explanatory embodiment shown in FIG. 2, said bearing base 443 preferably consists of a box-shaped structure comprising tubular elements, preferably with a rectangular cross section, that are connected to one another.

Said second measuring device 5 is preferably moved in a linear manner along said vertical axis "Z". In particular, said bearing base 443 is moved by said first actuator device 441 along said vertical axis "Z". Preferably, said actuator device 441 is a cylinder, for example a hydraulic or pneumatic cylinder, preferably a pneumatic cylinder.

In the embodiment shown, each first lifting structure comprises four first actuator devices 441, preferably four cylinders, which are arranged in the four corners of bearing base 443. The same first actuator devices 441 are fixed to fixed base 42, so that the weight force acts upon fixed base 42. In the suggested embodiment, said fixed base 42 weighs on said first measuring devices 3.

Said first actuator devices 441 have a stroke that is such as to allow said second measuring device 5 to come into contact with said measuring plate "D", thus causing the weight force of object "O" placed on measuring plate "D" to act upon the second measuring device 5.

In the embodiment shown, for example, in FIG. 2, said second measuring device 5 is caused to come into contact with said measuring plate "D" by means of a measuring frame 52, which directly weighs on said second measuring device 5.

In an alternative embodiment, which is not shown herein, said second measuring device 5 directly comes into contact with said measuring plate "D".

Said second measuring device 5 is lifted, so that the measuring plate "D" is lifted, for example through the action of measuring frame 52, so as to generate a gap or hollow space between measuring plate "D" itself and fixed base 42, in particular a gap between said support portions 424 and measuring plate "D". In the embodiment shown, the gap between said support portions 424 and measuring plate "D" is such that plate "D" itself—and, eventually, object "O" resting on it—does not weigh any longer on said fixed base 42 and, as a consequence, does not weigh any longer—at least directly—on said first measuring device 3.

In the explanatory embodiment shown in FIG. 2, said measuring frame 52 preferably consists of a box-shaped structure comprising tubular elements, preferably with a rectangular cross section, that are connected to one another. In the embodiment shown, said measuring frame 52 comprises a bottom 521, adapted to be arranged on the second measuring device 5, in particular on the second measuring surface 514, and uprights 523, which project from said bottom 521 and end in support portions 525.

In the preferred embodiment, a plurality of support portions 525 are provided, in particular at least one for each upright 523. Said support portions are shaped so as to be complementary to respective striker elements (not shown), which are comprised in said measuring plate "D".

In order to increase the rigidity of said measuring frame 52, at least one cross member 526 is provided, which is fixed between two uprights 523.

Multiple scale 2 described above makes up at least one aspect of the present invention, in particular it provides a multiple scale comprising a single measuring plate "D" on which to place the object. Through the activation or lack of activation of the first mobile structure 4 and, in particular, of the first lifting structure 44, object "O" can be measured with the measuring device that is deemed to be most suitable for its mass, thus obtaining the highest possible resolution of the measurement, without the risk of damaging one or more measuring devices (3, 5).

In the embodiment shown in the accompanying drawings, multiple scale 2 according to the present invention comprises a third measuring device 7.

In terms of capacity, the second measuring device 5 is able to measure greater masses than said third measuring device 7. In terms of resolution, said third measuring device 7 has a measuring resolution that is at least equal to, preferably higher than, the one of said second measuring device 5. Furthermore, the third measuring device has a higher measuring resolution than said first measuring device 3.

Said third measuring device 7 preferably is an electronic scale. By way of example, said third measuring device 7 has a capacity of approximately 300 kg with a resolution of ±5 g.

In the explanatory embodiment shown, for example, in FIG. 2, the third measuring device 7 comprises a casing 71 with the shape of a rectangle parallelepiped, feet 712 to support the third measuring device 7, which are arranged on the lower surface of casing 71, and a third measuring surface 714, which is arranged above the upper surface of casing 71 and defines a plane that is parallel to the plane defined by said measuring plate "D".

Casing 71 houses, on the inside, the electronic devices that are designed to generate an electronic signal that is proportional to the mass of object "O", which is arranged on the third measuring surface 714 of measuring device 7.

The capacities and the resolutions indicated in this description for the single measuring devices (3, 5, 7) are mere examples, since any type of measuring device with any kind of capacity and/or resolution can be used in the multiple scale according to the present invention, without for this reason going beyond the scope of protection of the present invention itself. Therefore, from the point of view of the sizes, the capacity and the resolution, the whole scale can be calibrated so as to measure masses not exceeding 100 kg with resolutions that are lower than ±1 g or masses not exceeding 3000 kg, for example keeping a resolution of approximately 100 g.

One can also use measuring devices employing technologies that are different from the one suggested herein, without for this reason going beyond the scope of protection of the present invention. The single measuring devices (3, 5, 7) comprised in multiple scale 2 can employ technologies that are different from one another.

Scale 2 according to the present invention comprises a second lifting structure 6, for selectively moving said third measuring device 7, so as to selectively cause said third measuring device 7 to come into contact with said measuring plate "D".

Said third measuring device 7 is at least partly moved, by means of said second lifting structure 6, along a vertical axis "Z". Said second lifting structure 6 can be able to move the third measuring device 7 by means of linear, rotary or rotary-translational movements, preferably just linear movements.

In an alternative embodiment, said third measuring device 7 is moved by means of said first mobile structure 4.

Said second lifting structure 6 is designed to allow the measurement to be performed by means of said third measuring device 7 instead of said first measuring device 3 or said second measuring device 5.

Preferably, said at least a third measuring device 7 is arranged so as to weigh on said first mobile structure 4. Said at least a second lifting structure 6 is preferably comprised in said first mobile structure 4. Preferably, the third measuring device 7 weighs on said first measuring device 3 by means of said first mobile structure 4.

Said second lifting structure 6 is designed to selectively lift said third measuring device 7 and comprising at least one second actuator device 61.

In the preferred embodiment, said second lifting structure 6 comprises a bearing base 63, on which said third measuring device 7 weighs and upon which said second actuating device 61 acts so as to at least partly move the third measuring device 7 along vertical axis "Z".

In the explanatory embodiment shown in FIG. 2, said bearing base 63 preferably consists of a box-shaped structure comprising tubular elements, preferably with a rectangular cross section, that are connected to one another.

Said third measuring device 7 is preferably moved in a linear manner along said vertical axis "Z". In particular, said bearing base 63 is moved by said second actuator device 61 along said vertical axis "Z". Preferably, said second actuator device 61 is a cylinder, for example a pneumatic or hydraulic cylinder.

In the embodiment shown, the second lifting structure comprises four actuator devices 61, in particular four cylinders, preferably pneumatic cylinders, which are arranged in the four corners of bearing base 63.

The second actuator devices 61 are fixed to fixed base 42, so that the weight force acts upon said first mobile structure 4. In the embodiment shown, the weight force consequently acts upon said first measuring devices 3.

In the explanatory embodiment shown, because of the size and the stroke of the second actuator devices 61, they are fixed to fixed base 42 by means of raising elements 612, which raise the second actuator devices 641 relative to bottom 421 of fixed base 42 to which they are fixed.

Said second actuator devices 61 have a stroke that is such as to allow said third measuring device 7 to come into contact with said measuring plate "D", thus causing the weight force to act upon said third measuring device 7.

In the embodiment shown, said third measuring device 7 comes into contact with said measuring plate "D" in a direct manner.

In an alternative embodiment, which is not shown herein, a measuring frame is provided, which is arranged on said third measuring device 7 and is substantially similar to measuring frame 52 associated with the second measuring device 5.

Said third measuring device 7 is lifted so that measuring plate "D" lifts. The lifting of said measuring plate "D" generates a gap or hollow space between measuring plate "D" itself and the fixed base 42, in particular a gap between said support portions 424 and measuring plate "D". The lifting of measuring plate "D" is such as to also generate a gap or hollow space between the measuring plate "D" itself and the second measuring device 5, in particular between said support portions 525—associated with measuring frame 52—and measuring plate "D".

The gap generated between measuring plate "D" and the second measuring device 5 as well as fixed base 42 is such that plate "D"- and, eventually, object "O" resting on it—does not weigh any longer either on said fixed base 42 or on said second measuring device 5.

In the embodiment shown, said gap is such that plate "D" itself—and, eventually, object "O" resting on it—does not weigh any longer, at least directly, on said first measuring device 3.

In general, multiple scale 2 according to the present invention requires one single measuring device to directly measure the mass of object "O" placed on measuring plate "D". Other measuring devices can measure said object "O" in an indirect manner. In the embodiment shown, the first measuring device 3 can perform an indirect measurement of object "O" placed on the measuring plate, when the second measuring device 5 or the third measuring device 7 are arranged in contact with measuring plate "D" itself. This is due to the fact that both the second measuring device 5 and the third measuring device 7 are fixed to said first mobile structure 4, which directly weighs on the first measuring device 3.

Said first measuring device 3, in the embodiment shown, will be subject to a pre-load due to all the elements of scale 2 weighing on it. The second measuring device 5 will be subject to a pre-load, as well, which is basically due to measuring frame 52.

In order to describe how the scale according to the present invention works, we will describe an explanatory—though not limiting—embodiment comprising three measuring devices.

In particular, FIGS. 3A, 3B and 3C show, in different views, the multiple scale of FIG. 2 in the configuration in which the first measuring device 3 measures the mass of object "O" placed on measuring plate "D", in particular, as shown in FIG. 3B, fixed base 42, by means of said support portions 424, is in direct contact with measuring plate "D". In this configuration, the second measuring device 5 and the third measuring device 7 are not in contact with measuring plate "D", in particular there is a gap. In this configuration, only the first measuring device 3 is able to detect the mass of object "O" placed on measuring plate "D". In order to obtain this configuration, both the first lifting structure 44—and, in particular, the first actuator device 441—and the second lifting device 6—and, in particular, the second actuator device 61—are in an inactive configuration, in particular they do not lift the relative measuring devices (5, 7).

FIGS. 4A, 4B and 4C show multiple scale 2 in the configuration in which the second measuring device 5 measures the mass of object "O" placed on measuring plate "D", in particular FIG. 4B shows measuring frame 52 in contact with said measuring plate "D" and, in particular, said support portion 525. In this configuration, the first measuring device 3 is not in direct contact with measuring plate "D" through fixed base 42. In particular, one can see that there is a gap between support portion 424 and measuring plate "D". Furthermore, the third measuring device 7 is not in contact with said measuring plate "D", either; in particular, there is a gap between the third measuring surface 714 and measuring plate "D".

In order to obtain this operating configuration, the first lifting structure 44 and, in particular, the first actuator device 441 are active. In particular, said first actuating device 441 extends along said axis "Z", so as to lift said second measuring device 5, in particular bearing base 443. At the same time, the second lifting structure 6 and, in particular, the second actuator device 61 are in an inactive configuration; in particular, they do not lift the relative third measuring device 7.

In this operating configuration, if the control device does not activate safety actuators 8, the first measuring device 3 performs an indirect measurement of the mass of object "O", as well. If the control device activates safety actuators 8, the first measuring device 3 cannot perform the measurement. Preferably, said safety actuators 8 are always active and are deactivated only when the first measuring device 3 is ready to carry out the measurement.

FIGS. 5A, 5B and 5C show multiple scale 2 in the configuration in which the third measuring device 7 measures the mass of object "O" placed on measuring plate "D", in particular FIG. 5B shows third measuring surface 714 in contact with said measuring plate "D". In this configuration, the first measuring device 3 is not in direct contact with measuring plate "D" through fixed base 42. In particular, one can see that there is a gap between support portion 423 and measuring plate "D". Furthermore, even the second measuring device 5 is not in contact with said measuring plate "D", either; in particular, there is a gap between measuring frame 52—and, in particular, support portion 525—and measuring plate "D".

In order to obtain this operating configuration, the second lifting structure 6 and, in particular, the second actuator device 61 are active. In particular, said second actuating device 61 extends along said axis "Z", so as to lift said third measuring device 7, in particular bearing base 63. At the same time, the first lifting structure 44 and, in particular, the first actuator device 441 are in an inactive configuration; in particular, they do not lift the relative second measuring device 5, thus ensuring a gap between measuring plate "D" and measuring frame 52. In this operating configuration, if the control device does not activate safety actuators 8, the first measuring device 3 performs an indirect measurement of the mass of object "O", as well.

Multiple scale 2 according to the present invention, as already mentioned above, comprises a locking system, which is able to prevent measurements from being carries out, if they are undesired or if operators are not sure that object "O" placed on measuring plate "D" has a mass that is smaller than the maximum capacity of the first measuring device 3. Furthermore, locking system 8 is preferably designed to lock the first measuring surface 33 of the first device 3, thus keeping it still, as the other measuring devices (5, 7) perform their measurements; by so doing, this surface is kept locked and avoids undesired oscillations, which, in some cases, can cause damages to the first measuring device.

In particular, said reference plane "R" comprises safety actuators 8, adapted to prevent multiple scale 2 from carrying out a measurement.

In the preferred embodiment, said safety actuators 8 are fixed, by means of safety flanges 34, to said first measuring surface 33 of the first measuring device 3. Said safety actuators 8, for example pistons, preferably pneumatic pistons, are adapted to prevent the first measuring surface 33 from performing tilting movements. In an explanatory—though not limiting—embodiment, said safety actuators 8 can be designed to extend in such a way that they at least partly lift said measuring surface 33.

As already mentioned above, multiple scale 2 according to the present invention comprises a control device, adapted to manage multiple scale 2 according to the present invention.

In a preferred embodiment, said control device is adapted to control actuators (441, 61, 8) comprised in scale 2, to receive electronic signals coming from measuring devices (3, 5, 7) and to process the relative data.

Furthermore, the control device is adapted to receive signals from a plurality of sensors (not shown), adapted to detect the limit stops of the different movable parts of scale 2 according to the present invention, for example position sensors of the actuators, which are known to a person skilled in the art.

Scale 2 according to the present invention, for the operation of the pneumatic and/or hydraulic devices, such as, for example, said actuators (441, 61, 8), comprises a hydraulic/pneumatic system, which is controlled by a motor, which is controlled by said control device.

Said control device comprises a non-volatile memory medium, where a computer program is stored, which can be executed by a data processing unit, which is comprised in the control device.

Figure 1B:
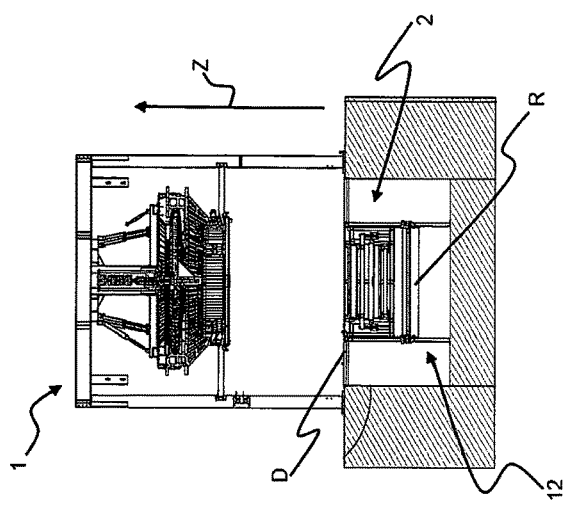
Figure 1A:
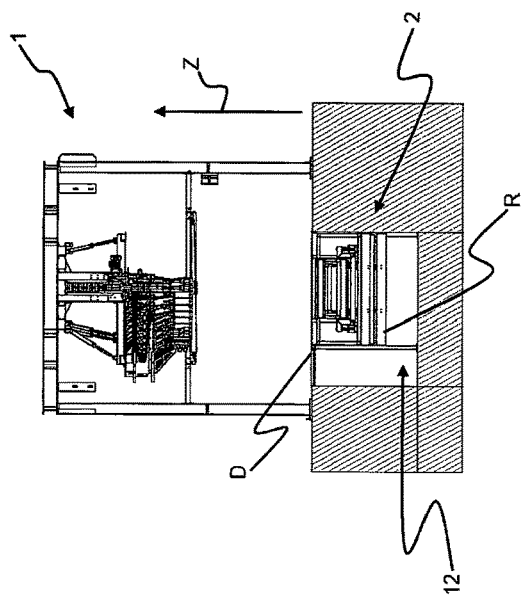

Multiple scale 2 according to the present invention is suited to be used in plants for the production of fluid substances, such as paints, in particular in the area of dosing stations 1, as shown by way of example in FIGS. 1A-1C.

In the embodiment shown, said scale 2 is arranged in a housing, which is obtained under the level of the ground on which dosing station 1 rests. In the explanatory embodiment shown, scale 2 and, in particular, reference plane "R" rest on a moving mechanism 12.

This moving mechanism 12 allows whole scale 2 to be moved, along said vertical axis "Z", between two operating configurations, in particular a first operating configuration, in which it is at the level of the ground or of the measuring plane, so as to be able to perform a measurement, and a second operating configurations, in which it cannot measure the mass of object "O" placed in the area of station 1.

Said moving mechanism 12, in the explanatory embodiment shown in FIGS. 1A-1B, is a hydraulic and/or pneumatic lifting system, wherein the reference plane slides along vertical guides.

Said moving mechanism 12, in the embodiment shown in FIG. 1C, is a pantograph structure, which is moved by an oil-pressure system. In the explanatory embodiment shown, reference plane "R" is built-in in moving mechanism 12.

Alternative embodiment that are equally designed to move scale 2 along vertical axis "Z" must be considered as part of the scope of protection of the present invention.

In an alternative embodiment, scale 2 and, in particular, reference plane "R" rest on a fixed structure, such as, for example, a fixed frame.

As already mentioned above, the control device is able to execute a computer program. Said program is configured to implement the following method to control a multiple scale 2 according to the description above.

The method comprises the following steps:

a) deactivating said first mobile structure 4 so as to cause the mass of the possible object "O" arranged on measuring plate "D" to weigh on said first measuring device 3;

b) detecting the mass of object "O" arranged on measuring plate "D";

c) checking the mass of object "O";

d) if the mass of object "O" is greater than a first threshold, performing the measurement with said first measuring device 3;

e) if the mass of object "O" is smaller than said first threshold, activating said first mobile structure 4.

During step a), the multiple scale is prepared, so that it can detect the mass of object "O" with the device with the greatest capacity. In order to do so, operators need to deactivate the first mobile structure 4 and, in particular, deactivate said first actuator devices 441, so that support portions 525 of measuring frame 52 arranged on the second measuring device 5 do not strike against measuring plate "D", thus crating a gap.

If necessary, before moving on to step b), the method comprises an initial step, during which the locking system is deactivated and, in particular, said safety actuators 8 are disabled. As already mentioned above, the locking system, when it is activated, prevents the first measuring device 3 from performing measurements, thus preventing it form being damaged due to the incautious positioning of an object with a mass exceeding the capacity of the first measuring device 3. Preferably, said safety actuators 8 can lock and stop the tilting movement of measuring surface 33, thus releasing said surface when the first measuring device must perform a measurement. Therefore, a sub-step a1) is preferably provided, during which safety actuators 8 are deactivated.

Subsequently, we move on to step b), during which the mass of object "O" arranged on measuring plate "D" is detected.

During this step, only the first measuring device 3 detects the mass of object "O" placed on measuring plate "D". This is due to the fact that the first measuring device 3 is the device with the greatest capacity.

After step b), we move on to step c), during which the mass of object "O" is checked. In particular, during step c), operators check whether the mass of object "O" exceeds a first threshold.

Said first threshold can be a function of the maximum capacity of the second measuring device 5, for the example $9/10$ths of said capacity.

To sum up, if the mass of object "O" is greater than said first threshold, the measurement will be performed by said first measuring device 3, for example keeping the previous measurement. Alternatively, for example in order to reduce uncertainty, operators can carry out—again—at least one further measurement by means of said measuring device 3, or they can perform different consecutive measurements.

In case the mass is below the threshold, the first mobile structure 4—in particular the first lifting structure 44—is activated, so that the mass of object "O" can be detected by the second measuring device 5.

Figure 6:
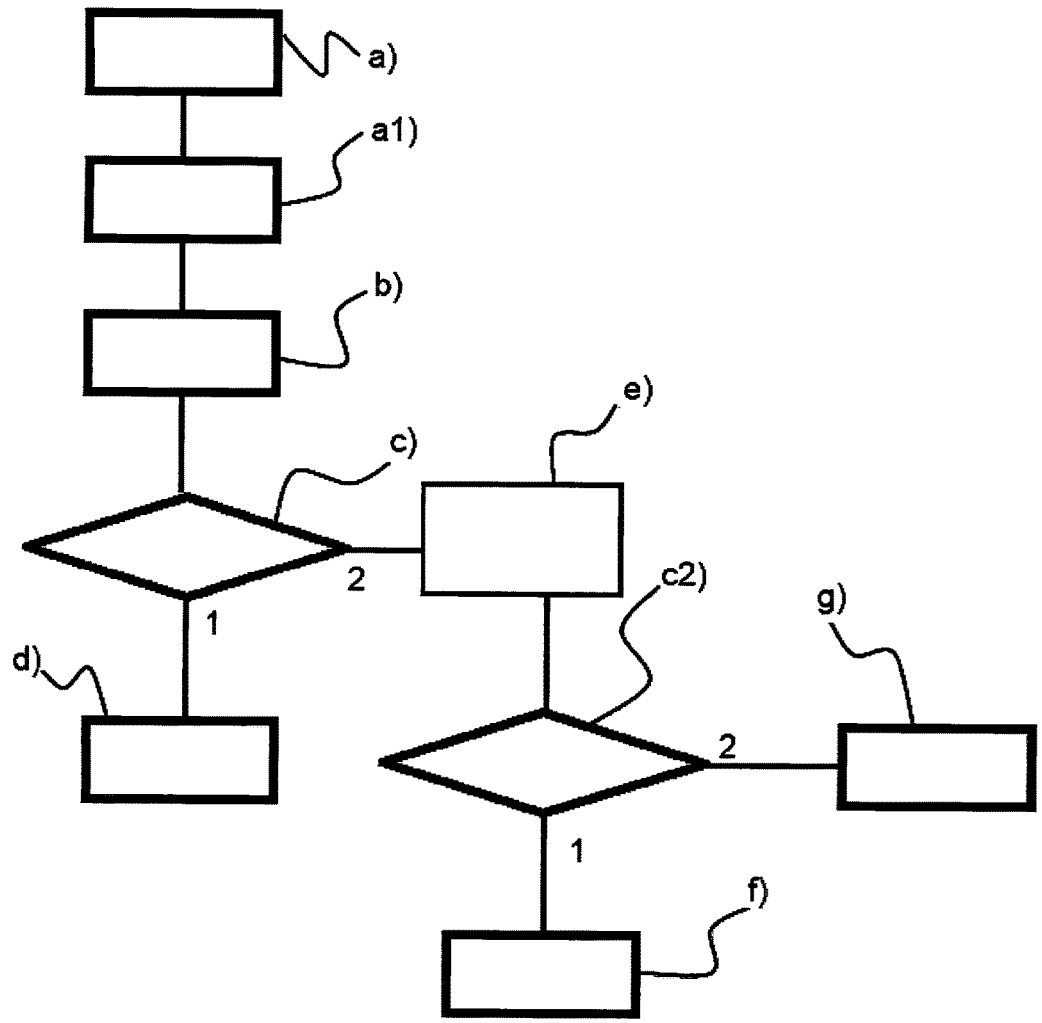
FIG. 6 shows a flowchart for the control of a scale according to FIG. 2, through which the multiple scale is activated in order to carry out a measurement with the highest possible resolution.

With reference to the explanatory flowchart of FIG. 6, if the mass of object "O" exceeds said first threshold, after step c) path 1 is followed, which leads to step d). During said step d), the mass of object "O" is measured by means of the first measuring device 3.

If the first mobile structure 4 was activated, the measurement will be performed by means of another measuring device, for example by means of said second measuring device 5.

In particular, if the mass of object "O" is below said first threshold, after step c) path 2 is followed, which leads to step e).

During said step e), as already mentioned above, the first mobile structure 4 is activated, in particular operators enable the lifting structure (44, 6) that is deemed to be the most appropriate to perform the measurement with the highest possible resolution, without damaging measuring device (5, 7).

If there are only two measuring devices, step e) is directly followed by a successive step f), during which the measurement is performed with said second measuring device 5.

In this case, which is not shown in detail, with the execution of step e), said first lifting structure 44 and, in particular, said first actuator device 441 are activated so as to move the second measuring device 5 along said vertical axis "Z". Therefore, at the end of said step e), step f) can be carried out, during which the second measuring device 5 measures the mass of object "O" arranged on measuring plate "D".

If there are more than two measuring devices, for example three measuring devices, in particular said third measuring device 7, after step c)—following path 2—a further checking step c2) is carried out, during which operators check whether the mass of object "O" exceeds a second threshold, as shown by way of example in FIG. 6.

In the flowchart shown in FIG. 6, by way of example, said step c2) is logically carried out after aforesaid step e). Preferably, said step e) and said step c2) are carried out in a substantially simultaneous manner, so that, after the check, the correct lifting structure (44, 6) is activated.

Back to the method according to the present invention, said second threshold may be a function of the capacity of the third measuring device 7, for the example $9/10$ths of said capacity.

In case the mass of object "O" exceeds said second threshold, said first lifting structure 44 is activated, which allows the measurement to be performed by means of the second measuring device 5. In case the mass of object "O" is below said second threshold, said second lifting structure 6 is activated, which allows the measurement to be performed by means of the third measuring device 7.

With reference to the explanatory flowchart of FIG. 6, if the mass of object "O" exceeds said second threshold, after step c2) path 1 is followed, which leads to step f). During said step f), the mass of object "O" is measured by means of said second measuring device 5.

On the other hand, if the mass of object "O" is below said second threshold, after step c2) path 2 is followed, which leads to step g). During said step g), the mass of object "O" is measured by means of the third measuring device 7.

As already mentioned above, before the respective step f) or g), the corresponding lifting structure (44, 6) must be activated so as to carry out the measurement by means of the corresponding measuring device (5, 7). At the same time, the lifting structure (6, 44) of the other measuring device (7, 5) must be disabled.

In particular, if the measurement must be carried out by means of said second measuring device 5, the first lifting structure 44 must be activated and lifted, whereas the second lifting structure 6 is lowered. On the contrary, if the measurement must be performed by means of said measuring device 7, said first lifting structure 44 must be deactivated and said second lifting structure 6 must be activated.

The control method, which is able to implement the method described above, can carry out, besides the comparison between the detected mass and the aforesaid thresholds, the device activation and deactivation activities.

Going on with the description of the functions of the control device in the application of scale 2 in a plant, object "O", in particular a container, after having been placed in a dosing position, in the area of the dosing station 1, is detected by at least one position sensor. Said at least one sensor is preferably electrically connected to said control device, so as to transmit the data detected.

The scale according to the present invention allows operators to measure, with the highest possible resolution, the mass of any object "O", for example a container for fluids, such as paints, which can be moved up to scale 2 even by means of wheels or vehicles. Multiple scale 2 according to the present invention cannot be damaged due to overloads on a measuring device. Furthermore, the first mobile structure 4 is built so as to avoid that stresses along directions lying on planes that are perpendicular to said axis "Z" do not influence the measurement. From a mechanical point of view, this allows operators to avoid a possible incorrect positioning of the different parts of multiple scale 2. Furthermore, from the point of view of the measurement of the mass of objects "O", this prevents said forces from distorting the measurement of the mass by introducing an undesired contribution to the weight force, which would cause an error in the measurement.

The scale according to the present invention significantly simplifies the measurement and the positioning of the container in stations 1 requiring a control of the mass of object "O", for example a dosing station.

The control device protects all the measuring devices from a possible overload and is able to determine which measuring device is the most suitable for the purpose of obtaining, anyway, the highest measuring resolution possible.

NUMERICAL REFERENCES

Station 1
Moving mechanism 12
Multiple scale 2
First measuring device 3
Casing 31
Feet 32
First measuring surface 33
Safety flange 34
First mobile structure 4
Fixed base 42
Bottom 421
Uprights 422
Upper structure 423
Support portions 424
First lifting structure 44
First actuator device 441
Bearing base 443
Second measuring device 5
Casing 51
Feet 512
Second measuring surface 514
Measuring frame 52
Bottom 521
Uprights 523
Support portion 525
Cross member 526
Second lifting structure 6
Second actuator device 61
Raising element 612
Bearing base 63
Third measuring device 7
Casing 71
Feet 712
Third measuring surface 714
Safety actuators 8
Measuring plate D
Objects O
Reference plane R
Vertical axis Z

The invention claimed is:

1. A multiple weighing scale comprising:
a first measuring device and at least a second measuring device, both for detecting masses of objects;
a single measuring plate, which is shared by the first measuring device and the second measuring device, arranged in contact with said first measuring device at least in an initial operating configuration;
at least one first mobile structure, for selectively moving said second measuring device so as to selectively cause said second measuring device to come into contact with said measuring plate, in order to allow the measurement to be performed by said second measuring device instead of said first measuring device.

2. The weighing scale according to claim 1, wherein:
said first measuring device is arranged above a reference plane;
said first measuring device is configured to measure greater masses than said second measuring device;
said at least one first mobile structure is arranged on said first measuring device, so that said at least one second measuring device weighs on the said first measuring device.

3. The weighing scale according to claim 1, wherein said first mobile structure comprises:
a fixed base, on which, in at least one first initial operating configuration, said measuring plate weighs;
a first lifting structure, for selectively lifting said second measuring device comprising at least one first actuator device.

4. The weighing scale according to claim 3, wherein said first lifting structure comprises a bearing base, on which said second measuring device weighs and upon which said first actuating device acts so as to move the second measuring device.

5. The weighing scale according to claim 1, wherein said second measuring device is moved in a linear manner along a vertical axis.

6. The weighing scale according to claim 1, wherein said second measuring device is caused to come into contact with said measuring plate by a measuring frame, which directly weighs on said second measuring device.

7. The weighing scale according to claim 1, further comprising a third measuring device; said second measuring device is configured to measure greater masses than said third measuring device.

8. The weighing scale according to claim 7, comprising at least one second lifting structure for selectively moving said third measuring device so as to selectively cause the third measuring device to come into contact with the measuring plate.

9. The weighing scale according to claim 8, wherein said second lifting structure comprises:
a bearing base on which said third measuring device weighs; and
at least one second actuator device, acting upon said bearing base so as to partially move the third measuring device at least along a vertical axis.

10. The method to control a multiple weighing scale according to claim 1, comprising the following steps:
a) deactivating said first mobile structure so as to cause the mass of the possible object arranged on the measuring plate to weigh on said first measuring device;
b) detecting the mass of the object arranged on said measuring plate;
c) checking the mass of the object;
d) if the mass of the object is greater than a first threshold, performing the measurement with said first measuring device;

e) if the mass of the object is less than said first threshold, activating said first mobile structure.

11. The method according to claim 10, wherein, if the mass of the object is less than the first threshold, said first lifting structure is activated by activating said first actuator device in order to move the second measuring device.

12. The method according to claim 10, wherein, if the mass of the object is less than the first threshold, after step c), a further checking step c2) is performed, comprising if the mass of the object is greater than a second threshold.

13. The method according to claim 12, wherein:
   if the mass of the object is less than the first threshold but greater than said second threshold, said first lifting structure is activated so as to move the second measuring device;
   if the mass of the object is both less than the first threshold and less than said second threshold, said second lifting structure is activated so as to move the third measuring device.

\* \* \* \* \*